US012489735B2

(12) United States Patent
Thorold Barnett (10) Patent No.: US 12,489,735 B2
(45) Date of Patent: Dec. 2, 2025

(54) SYSTEM AND METHOD FOR DNS TUNNELING PROTECTION

(71) Applicant: OPEN TEXT INC., Menlo Park, CA (US)

(72) Inventor: Jonathan Alexander Thorold Barnett, Lafayette, CO (US)

(73) Assignee: OPEN TEXT INC., Menlo Park, CA (US)

( * ) Notice: Subject to any disclaimer, the term of this patent is extended or adjusted under 35 U.S.C. 154(b) by 151 days.

(21) Appl. No.: 18/174,382

(22) Filed: Feb. 24, 2023

(65) Prior Publication Data

US 2023/0291715 A1    Sep. 14, 2023

Related U.S. Application Data

(63) Continuation-in-part of application No. 17/344,400, filed on Jun. 10, 2021, now Pat. No. 11,750,562.
(Continued)

(51) Int. Cl.
*H04L 29/00* (2006.01)
*H04L 9/40* (2022.01)

(52) U.S. Cl.
CPC ........ *H04L 63/029* (2013.01); *H04L 63/1416* (2013.01); *H04L 63/1425* (2013.01); *H04L 63/20* (2013.01)

(58) Field of Classification Search
CPC ... H04L 63/20; H04L 63/0236; H04L 63/107; H04L 63/16; H04L 63/10; H04L 63/0209
See application file for complete search history.

(56) References Cited

U.S. PATENT DOCUMENTS 7,743,094 B2 * 6/2010 Metke .................... H04L 61/25
                                                      709/221
7,926,108 B2 * 4/2011 Rand ................... G06Q 10/107
                                                      726/22
(Continued)

FOREIGN PATENT DOCUMENTS

CN         108390808         8/2018

OTHER PUBLICATIONS

European Search Report issued for European Application No. 21821707 mailed Jul. 1, 2024, 8 pages.
(Continued)

*Primary Examiner* — Longbit Chai
(74) *Attorney, Agent, or Firm* — Sprinkle IP Law Group (57) ABSTRACT

Embodiments of systems and methods for DNS leak prevention and protection, including protection against DNS tunneling attacks, are disclosed herein. In particular, certain embodiments include a local DNS protection agent installed on a system and an associated trusted external DNS protection server. The DNS protection agent prevents DNS leaks from applications on the system such that all DNS requests from the system are confined to requests from the DNS protection agent to the associated DNS protection server. As the DNS leak prevention provided by the DNS protection agent stops applications on the system from circumventing the DNS protection server, all DNS requests originating from the system remain under the control of the DNS protection server and thus desired DNS protection (e.g., as implemented on the DNS protection server) may be maintained. Certain embodiments prevent applications from using certain DNS security protocols, such as DoH and DoT, without going through the DNS protection agent. Embodiments are also capable of detecting and addressing DNS tunneling attacks.

20 Claims, 8 Drawing Sheets

Related U.S. Application Data (60) Provisional application No. 63/037,425, filed on Jun. 10, 2020.

(56) References Cited

U.S. PATENT DOCUMENTS

| | | | |
|---|---|---|---|
| 10,453,017 B1 | 10/2019 | Richards | |
| 11,012,414 B2* | 5/2021 | Moore | H04L 63/20 |
| 12,309,117 B2 | 5/2025 | Barnett | |
| 2016/0308875 A1* | 10/2016 | Judge | H04L 63/20 |
| 2017/0310709 A1 | 10/2017 | Foxhoven | |
| 2023/0275873 A1 | 8/2023 | Barnett | |
| 2023/0412563 A1 | 12/2023 | Barnett | |

OTHER PUBLICATIONS

Notice for Allowance for U.S. Appl. No. 18/315,184, mailed Dec. 9, 2024, 11 pgs.

Farnham, Greg, "Detecting DNS Tunneling," Global Information Assurance Certifications Paper, Feb. 25, 2013, 31 pages.

Olzak, Tom, "DNS Tunneling Identification and Defense," University of Phoenix, Oct. 2019, 11 pages.

Notice of Allowance issued for U.S. Appl. No. 18/457,269, mailed Jun. 4, 2025, 13 pgs.

* cited by examiner

SYSTEM AND METHOD FOR DNS TUNNELING PROTECTION

CROSS-REFERENCE TO RELATED APPLICATION(S)

This application is a continuation-in-part of, and claims a benefit of priority under 35 U.S.C. 120 of, U.S. patent application Ser. No. 17/344,400 filed Jun. 10, 2021, issued as U.S. Pat. No. 11,750,562, entitled "SYSTEM AND METHOD FOR LEAK PREVENTION FOR DOMAIN NAME SYSTEM REQUESTS," which claims priority to U.S. Provisional Application No. 63/037,425, entitled "SYSTEM AND METHOD FOR LEAK PREVENTION FOR DOMAIN NAME SYSTEM REQUESTS," filed on Jun. 10, 2020, the entire disclosures of which are hereby incorporated by reference in their entireties.

TECHNICAL FIELD

This disclosure relates to network data security. More specifically, this disclosure relates to leak protection for domain name system (DNS) requests. Even more specifically, this disclosure relates to leak protection for domain name system (DNS) requests that uses a locally-installed DNS protection agent to handle DNS requests to maintain visibility of and control of DNS requests.

BACKGROUND

The process of DNS resolution involves converting a hostname into a computer-friendly IP address. Each domain or subdomain has one or more authoritative DNS servers that publish information about that domain and the name servers of any domains "beneath" it. Users typically do not communicate directly with DNS servers. Instead, DNS resolution takes place transparently by the operating system for applications such as web-browsers, mail-clients, or other Internet applications. When an application makes a request which requires a DNS lookup, a request is made of the operating system and the operating system then generates a DNS resolution request for a local and/or external DNS server.

One problem with conventional DNS pertains to visibility. For example, administrators of a network may want to see DNS requests that users are making. Such visibility allows administrators to both track users and see what devices or applications those users are using, and monitor the network for potential problems. Viruses or other malware may use the network and thus may also result in DNS requests, and visibility may be used to diagnose security issues (e.g., the presence of malware) or other problems within the network.

One problem with conventional DNS pertains to privacy. For example, the use of DNS may expose users or requestors on the network. These exposed requestors might be applications the user uses, internet connected devices, etc. DNS may also expose what websites or domains a user is visiting, etc. As almost everything on the network uses DNS, these DNS requests may expose how users use the network and internet.

One problem with conventional DNS pertains to security. For example, the use of DNS may expose users or requestors to malicious or harmful domains on the internet by providing the corresponding address. These exposed requestors might be applications the user uses, internet connected devices, etc.

As discussed below, one problem relating to DNS security is that they have found ways to target and exploit DNS servers, including DNS tunneling attacks. Generally, DNS tunneling is an attack that uses other protocols to tunnel through DNS queries and responses. Attackers can use SSH, TCP, or HTTP to pass malware or stolen information into DNS queries, undetected by most firewalls.

SUMMARY

To address these needs, among others, embodiments of systems and methods for DNS leak prevention and protection are disclosed herein. In particular, certain embodiments include a DNS protection agent installed on a system and associated DNS protection servers. The DNS protection agent installed on the system prevents DNS leaks from applications on the system such that all DNS requests from the system are confined to requests from the DNS protection agent to the associated DNS protection servers. All DNS requests from the system are thus resolved or otherwise handled through the DNS protection agent. All DNS requests originating from the system remain under the control of the DNS protection agent and thus desired DNS protection is maintained.

DNS requests are enabled to a locally installed DNS protection agent for managing DNS resolution. An application request for an Internet resource is intercepted by the DNS protection agent, and the request is sent to the DNS protection server to resolve the IP address or resource. A response to the application may include either the IP address for the requested Internet resource or an alternate IP address that references a DNS Protection Web Server to display a denial message. A determination of the appropriate response can be based on an evaluation of a security policy associated with the client device.

A locally-installed DNS protection agent monitors ports associated with DNS security protocols (e.g., DNS, DoH, DoT, etc.). When the DNS protection agent detects an attempted communication on one of the monitored ports, an intended recipient address associated with the attempted communication is identified. Communication to the intended recipient address is either blocked directly or compared with addresses of known DNS resolvers stored in a DNS resolver database to attempt to associate the intended recipient address with a known DNS resolver. If the address matches a known DNS resolver, communication over the respective monitored port is blocked, thus maintaining control over the DNS requests.

In some embodiments, a DSN protection server detects the presence of a possible DNS tunneling attack. If no DNS tunneling is detected, a request is handled normally. If a possible DNS tunneling attack is detected, the DSN protection server does not forward the request, and returns a block page address.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

It may be useful to begin with some context that may be helpful for an understanding of embodiments. The Domain Name System (DNS) is the phonebook of the Internet. Humans access information online through domain names, like nytimes.com or espn.com. Web browsers or other applications interact through Internet Protocol (IP) addresses. DNS translates domain names to IP addresses so browsers or other applications can load Internet resources.

Each device connected to the Internet has a unique IP address which other machines use to find the device. DNS eliminates the need for humans to memorize IP addresses such as 192.168.1.1 (in IPv4), or more complex newer alphanumeric IP addresses such as 2400:cb00:2048:1::c629:d7a2 (in IPv6). An IP address is given to each device on the Internet, and that address is necessary to find the appropriate Internet device—like a street address is used to find a particular home. When a user wants to load a webpage, a translation must occur between what a user types into their web browser (desiredsite.com) and the machine-friendly address necessary to locate the example.com webpage.

Thus, the process of DNS resolution involves converting a hostname (such as www.desiredsite.com) into the computer-friendly IP address (such as 192.168.1.1). DNS comprises a hierarchical set of DNS servers. Each domain or subdomain has one or more authoritative DNS servers that publish information about that domain and the name servers of any domains "beneath" it. The hierarchy of authoritative DNS servers matches the hierarchy of domains. At the top of the hierarchy stand the root nameservers: the servers to query when looking up (resolving) a top-level domain name (TLD).

To better understand embodiments, it may now be useful to discuss a process of DNS resolution. As may be understood, users usually do not communicate directly with DNS. Instead DNS-resolution takes place transparently in applications such as web-browsers, mail-clients or other Internet applications. When an application makes a request which requires a DNS lookup, such applications make a DNS request of the operating system, which sends a DNS resolution request to the configured DNS resolver, which in turn handles the communications required.

Figure 1:
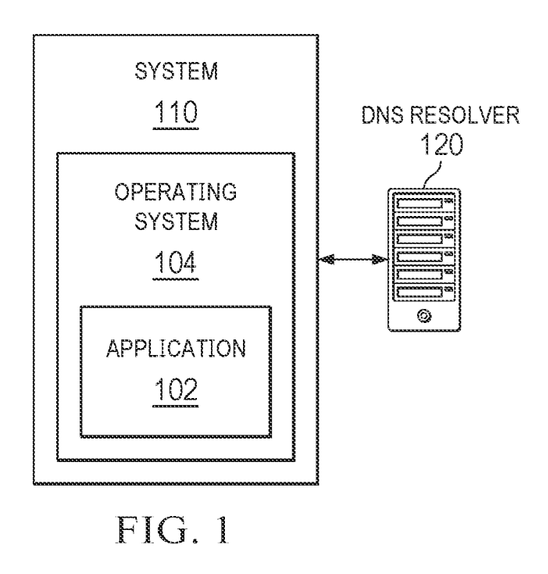
FIG. 1 depicts an architecture for a system using DNS.

Turning then to FIG. 1, an illustration of the functioning of DNS is depicted. An application 102 on a system (device) 110 that desires to communicate with other devices on the Internet utilizes DNS to obtain the address for a desired domain. For purposes of discussion a web browser 102 (e.g., Firefox, Google Chrome, etc.) will be used as an example application 102, but it will be understood that this example is utilized without loss of generality and that embodiments as discussed herein will be equally effectively utilized with any application that utilizes DNS.

Thus, when a web browser or other application 102 wishes to locate a DNS record the web browser 102 may first check its local DNS cache to see if it has fielded this particular request before. As is known in the art, modern web browsers are designed by default to cache DNS records for a set amount of time. This is because the closer the DNS caching occurs to the web browser 102 (or other application making a DNS request), the fewer processing steps must be taken in order to check the cache and make the correct requests to an IP address. If the desired DNS record is not in the browser's cache, the web browser 102 may send a request to operating system 104 on the system 110.

The operating system 104 is the second and last local stop before a DNS query leaves a device 110. The process inside the OS DNS service 104 that is designed to handle this query is commonly called a "stub resolver" or DNS client. When the operating system 104 gets a request from an application 102, it first checks its own cache to see if it has the desired DNS record. If it does not, it then sends a DNS request (e.g., with a recursive flag set), to an external DNS server 120. When DNS resolver 120 is not able to field the request from cache, the request is forwarded to other servers. DNS resolver 120 may be located, for example, inside an enterprise or on a local network, or would be provided by an Internet service provider (ISP) or other Internet location.

The DNS resolver 120 likely has a cache containing recent lookups. If the cache at the DNS resolver 120 can provide the answer to the request, the resolver 120 will return the value via the servers to the application 102 that made the request (e.g., through the operating system). If the cache does not contain the answer, the resolver 120 will send the request to one or more designated DNS servers or in recursive manner (not shown).

DNS is not without its problems, however. Some of these issues pertain to visibility. As one example, administrators of a network may want to see DNS requests users are making. Such visibility allows administrators to both track users and see what devices or applications those users are using, and monitor the network for potential problems. This is because viruses or other malware will likely use the network and thus may result in DNS requests (in some cases many) that may be used to diagnose security issues (e.g., the presence of malware) or other problems within the network.

Other types of DNS issues pertain to security. In particular, the use of DNS exposes the users or requestors on the network. These exposed requestors might be applications the user uses, devices (e.g., Internet of Thing (IOT) devices), what websites or domains a user is visiting, etc. As everything on the network uses DNS, these DNS requests expose how users use the network.

Moreover, Standard DNS queries, which are required for almost all internet traffic, create opportunities for DNS exploits such as DNS hijacking, and man-in-the-middle attacks. These attacks can redirect a website's inbound traffic to a fake copy of the site, collecting sensitive user information and exposing businesses to major liability.

Specifically, attackers have found a number of ways to target and exploit DNS servers, some of the most common include DNS spoofing, DNS tunneling or DNS hijacking. DNS spoofing/cache poisoning is an attack where forged DNS data is introduced into a DNS resolver's cache, resulting in the resolver returning an incorrect IP address for a domain. Instead of going to the correct website, traffic can be diverted to a malicious machine or anywhere else the attacker desires, Often, this will be a replica of the original site used for malicious purposes such as distributing malware or collecting login information.

DNS tunneling is an attack that uses other protocols to tunnel through DNS queries and responses. Attackers can use SSH, TCP, or HTTP to pass malware or stolen information into DNS queries, undetected by most firewalls. In DNS hijacking, the attacker redirects queries to a different domain name server. This can be done either with malware or with the unauthorized modification of a DNS server. Although the result is similar to that of DNS spoofing, this is a fundamentally different attack because it targets the DNS record of the website on the nameserver, rather than a resolver's cache.

Accordingly, to increase the security and privacy in association with the use of DNS, among other advantages, embodiments of a DNS protection system are disclosed. Embodiments of such a DNS protection system may include a DNS protection agent installed on systems within a network and an associated DNS protection server. The DNS protection agent installed on the system may serve to prevent DNS leaks from applications on the system such that all DNS requests from the system are confined to requests from the DNS protection agent to the associated DNS protection server or allowed internal DNS servers, such that all DNS requests from the system may be resolved or otherwise handled through the DNS protection agent. As the DNS leak prevention provided by the DNS protection agent may stop applications on the system from circumventing the DNS protection agent, all DNS requests originating from the system may remain under the control of the DNS protection agent and thus desired DNS protection (e.g., as implemented by the DNS protection agent) may be maintained.

Figure 2:
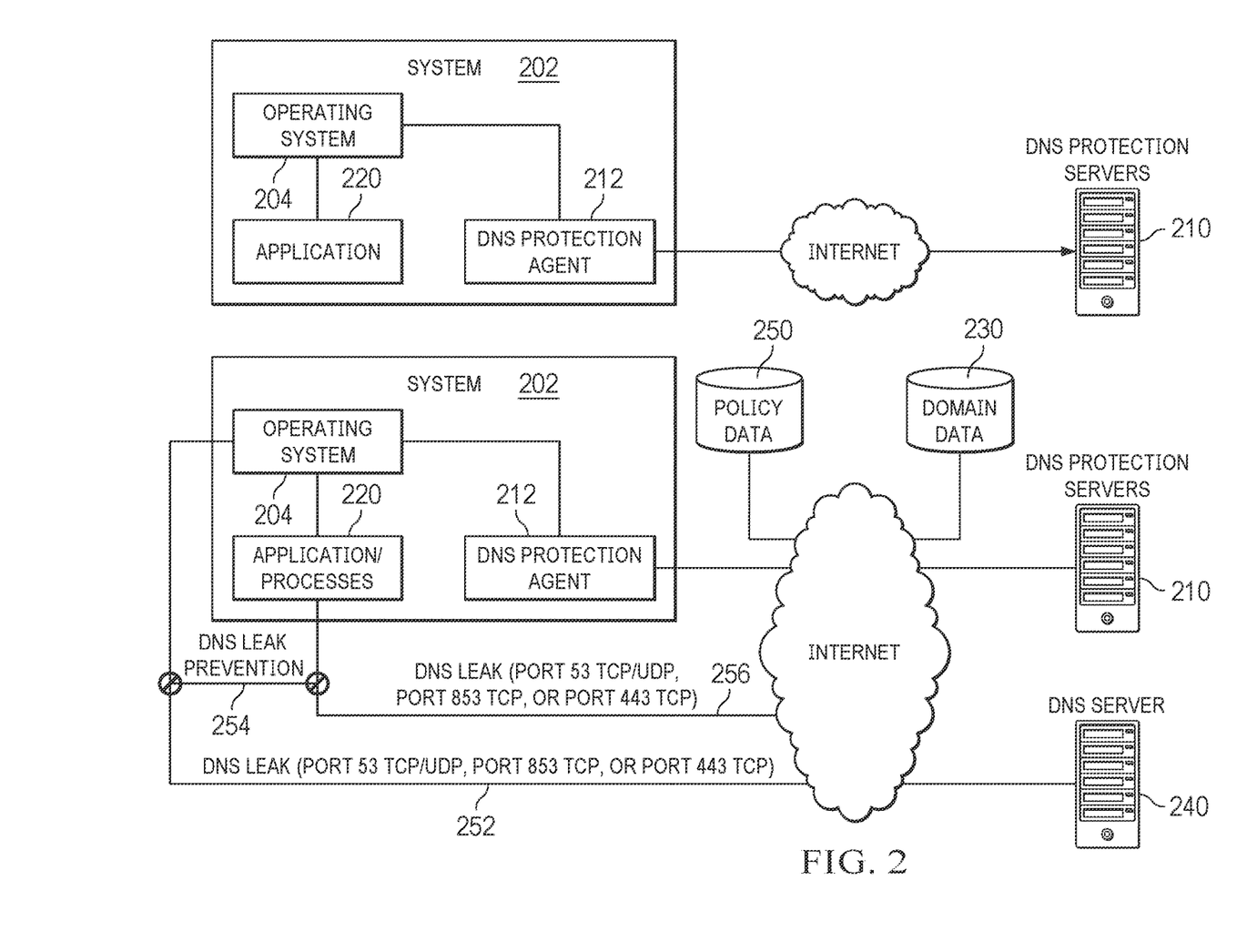
FIG. 2 depicts one embodiment of an architecture including an embodiment of a DNS leak prevention and protection system.

Turning then to FIG. 2, one embodiment of an architecture for a distributed computing network including one embodiment of a DNS protection system including a DNS protection agent 212 and DNS protection servers 210 is depicted. Specifically, one or more DNS protection servers 210 may serve as a DNS resolver for a set of systems 202 in a distributed computing network. These systems 202 may, for example, be a group of computing systems (also referred to as devices or client devices) 202 for which it is desired to provide DNS protection such as systems 202 within an enterprise, a home network, a Local Area Network (LAN), a Wide Area Network (WAN), etc. Each system 202 uses the operating system for DNS resolution which is configured to redirect DNS requests to the DNS Protection agent.

Thus, it may be the case that applications or processes 220 on the system 202 may make requests directly to a DNS resolver 240. Specifically, DNS requests may be sent directly from an application or process 220 to DNS resolver 240, or may be sent from the operating system 202 to the DNS resolver 240.

In many cases, when a process or an application 220 such a web browser or the like makes a DNS request (e.g., if the desired DNS record is not in a cache of the application 220), this DNS request may first be made to the operating system 204 on the system 202, which will check its cache to determine if the DNS request can be satisfied from cache. If the DNS request from the application 220 cannot be satisfied from cache, it may send a DNS request to a DNS resolver 240. The address of the DNS resolver 240 to which the request is sent is configured in the operating system 204 such that the DNS service 204 is aware of the address of the DNS resolver 240. This request is typically sent using UDP or TCP Port 53.

In some instances, DNS requests may be sent directly from an application 220 to DNS resolver 240. For example, certain web browsers are now configured to establish direct connections to configured DNS resolvers (e.g., such as Cloudflare™ or Google DNS resolvers) and make DNS requests directly to these DNS resolvers 240. These requests may also be sent using TCP or UDP Port 53. However as discussed above, for a variety of reasons, including those concerning security or privacy, it may be less than desirable to utilize DNS resolver 240 that is out of the control of entities providing system 202 or other trusted entities.

Accordingly, it may be desirable that all DNS resolution for all applications 220 on the systems 202 be handled through DNS protection agent 212 and be resolved (or otherwise handled) using DNS protection server 210 that may be implemented, for example, by an entity associated with systems 202, or that is trusted by such an entity. Thus, DNS protection agent 212 may be installed on each system 202. DNS protection agent 212 may configure and interact with the associated system 202 (or applications 220 thereon) such that DNS resolution for the applications or processes 220 of the system is handled through the DNS protection agent 212 and DNS leak protection is implemented such that no DNS requests may be sent from system 202 except by the DNS protection agent 212.

Thus, when DNS protection agent 212 is installed on system 202, DNS protection agent 212 may configure the operating system to redirect DNS requests to the DNS Protection agent 212 (e.g. the DNS Protection agent would set the DNS server address on the operating system to be a loopback address (e.g., 127.0.0.1) and would be configured to receive DNS requests from the operating system 204 and, through this configuration, manage DNS requests from the operating system 204).

As such, when the DNS protection agent 212 is enabled, it may block all outbound requests on port 53 (e.g., using a firewall software or driver). In this manner, when application 220 attempts to directly send a DNS request to a DNS resolver 240 over port 53, it may be blocked from doing so. In many cases, if an application's attempts to send a DNS request directly to DNS resolver 240 fails (or fails multiple times), the application 220 may then send (or reroute) such a DNS request to the operating system 204. In this manner, DNS protection agent 212 may provide DNS leak protection such that no DNS requests may be issued over port 53 expect those issued to the operating system and managed by the DNS Protection agent 212.

When a DNS request is received by the DNS protection agent 212 then (e.g., a DNS request sent by the operating system 204 to the loopback address), the DNS protection agent 212 may send the DNS request to DNS protection server 210. The DNS protection agent 212 may, for example, communicate with DNS protection server 210 over a secure DNS protocol such as DNS over HTTPS (DoH) or DNS over TLS (DoT), as discussed elsewhere herein.

DNS protection server 210 may receive the DNS request from the DNS protection agent 212 and make a determination as to how handle the DNS request. For example, if the domain associated with the received DNS request is not a blocked domain, the DNS protection server 210 can return the DNS record for the DNS request (e.g., which may involve contacting one or more other DNS servers). However, if the domain associated with the DNS request is blocked, the DNS protection server 210 may return the address of a DNS Protection Web Server to display a block notification.

The determination whether a domain is blocked may be made with reference to domain data 230 looked up by DNS protection server. In one embodiment, for example, this domain data may include data on the domain, Universal Resource Locators (URLs), contextual machine learning data on the domain or other data. Such data, for example, may be data from BrightCloud® web classification or web reputation services and may be regularly obtained or updated. Thus, the domain requested or other aspects of the DNS request received at DNS protection server 210 may be evaluated against the domain data 230 to determine if a DNS request is to be responded to with the requested domain or a denial returned (e.g., the address of a blocked page or another block or error indication) returned.

In some embodiments, system policy data 250 may also be utilized to determine a response to a received DNS request. Such policies may be provided by an administrator, or otherwise determined, and may specify, for example, security policies regarding what types of domains or web sites a system or user may access. Such policies may specify certain classifications or reputation scores (e.g., as identified in domain data 230) for domains which a system 202 or user may (or may not) access.

For example, a received DNS request may be identified with the particular system 202 where the request originated. A policy associated with the identified systems 202 may be looked up in system policy data 250. The identified policy for the system 202 where the requests originated can then be evaluated for the received DNS request (e.g., using domain data 230 associated with the domain requested). Based on the evaluation of the identified policy for the system 202 or user, a determination can be made whether the received DNS request is to be responded to with the requested domain or a block page (e.g., the address of a blocked page notification or another block or error indication).

The response returned by the DNS protection server 210 to the DNS protection agent 212 may then be returned to the requesting application 220 (e.g., through the operating system 204 on the system 202). Thus, if the requested domain was blocked, a blocked page or other error message may be accessed by the application. If the domain of the original DNS request was not blocked, the domain may be accessed by the application 220. In this manner, DNS resolution for the applications 220 of the system 202 is handled through the DNS protection agent 212 and DNS protection server 210 and DNS leak protection is implemented such that no DNS requests may be sent from system 202 except by the DNS protection agent 212.

Recently however, new security protocols are being utilized for such DNS requests, including DNS over HTTPS (DoH) and DNS over TLS (DoT). DoH is a protocol for performing DNS resolution via the HTTPS protocol. One goal of this method is to increase user privacy and security by preventing eavesdropping by using the HTTPS protocol to encrypt the data between the application and the DoH-based DNS resolver. DoH is basically a secure sockets layer (SSL) connection back to a DNS resolver. DoT is similar standard for encrypting DNS queries, differing in the methods used for encryption and delivery. DoT is a network security protocol for encrypting and wrapping DNS queries and answers via the Transport Layer Security (TLS) protocol. These security protocols for DNS may utilize different ports, such as port 443 for DoH or port 853 for DoT. In order to implement DNS leak protection and ensure that DNS resolution is accomplished only through DNS protection server 210, DNS protection agent 212 may monitor one or more ports of the system 202 utilized with such secure DNS protocols.

These security protocols present challenges with regard to maintaining visibility of and control of DNS requests. For example, port 443 cannot simply be blocked, without affecting conventional secure traffic over port 443, such as with banking websites or other HTTPS traffic. Because there may be no visibility to contents of HTTPS traffic, it may be desired to control whether that connection occurs at all. With respect to DoT, which generally uses a dedicated port (e.g., port 853), it may be more useful to block port 853 connections, for example, via a local firewall, driver, packet inspections, etc., as one skilled in the art would understand.

Protection agent 212 may monitor port 443 of system 202. Protection agent 212 may also maintain a DNS resolver database (not shown) of known DNS resolvers 240 for these secure DNS protocols (e.g., the IP addresses or such DNS resolver 240). Such a DNS resolver database may be installed at the time of installation of DNS protection agent 212, or may be data from BrightCloud® web classification or web reputation services and may be regularly obtained or updated, for example through communication with DNS protection server 210 (or another service) if needed (e.g., when new DNS resolvers 240 are determined or are retired, the agent 212 is updated for new DNS security protocols, etc.).

Thus, the DNS protection agent 212 may compare the address associated with monitored communications on the monitored ports (e.g., port 443) with the address of the known DNS resolvers 240 in the DNS resolver database. If an address of a communication on a monitored port is in the database of known DNS resolvers, this communication may be blocked (e.g., using a driver or firewall on the system 202, such as the Windows firewall or the like). In this manner, DNS leaks over the monitored ports, including DNS leaks resulting from an application's use of a secure DNS protocol, or the DNS service's use of these secure DNS protocols, over the monitored ports may be prevented.

In many cases, if an application attempts to send a DNS request directly to DNS resolver 240 (e.g. using a secure DNS protocol) fails, the application 220 may then send (or reroute) such a DNS request to the operating system 204. In this manner, DNS protection agent 212 may provide DNS leak protection such that no DNS requests may be issued over ports utilized by secure DNS protocols.

FIG. 2 also graphically illustrates DNS leak prevention with respect to requests made by application 220 or the operating system 204. If application 220 makes a DNS request (e.g., via Port 53 TCP or UDP, via DoT Port 853, via an alternate port, or via an SSL request (port 443 TCP)), as illustrated by reference numeral 252, the system described above will block the connection. Similarly, if the operating system 204 makes a DNS request (e.g., via Port 53 TCP or UDP, via DoT Port 853, via an alternate port, or via an SSL request (port 443 TCP)), as illustrated by reference numeral 256, the system described above will block the connection.

As can be seen, embodiments may prove especially effective at DNS leak prevention and DNS security generally. In fact, DNS leak prevention and protection can even work in the context of a page to prevent that page from requesting bad or malicious resources. As when loading a page, each file or link that must be fetched by loading that page may cause DNS requests to issue. Embodiments as disclosed herein can provide leak prevention and DNS protection on each of those subsequent DNS requests individually. In this manner, a page may load or display with only those portions of a page that may be associated with bad or malicious domains or DNS requests may be blocked.

Figure 3:
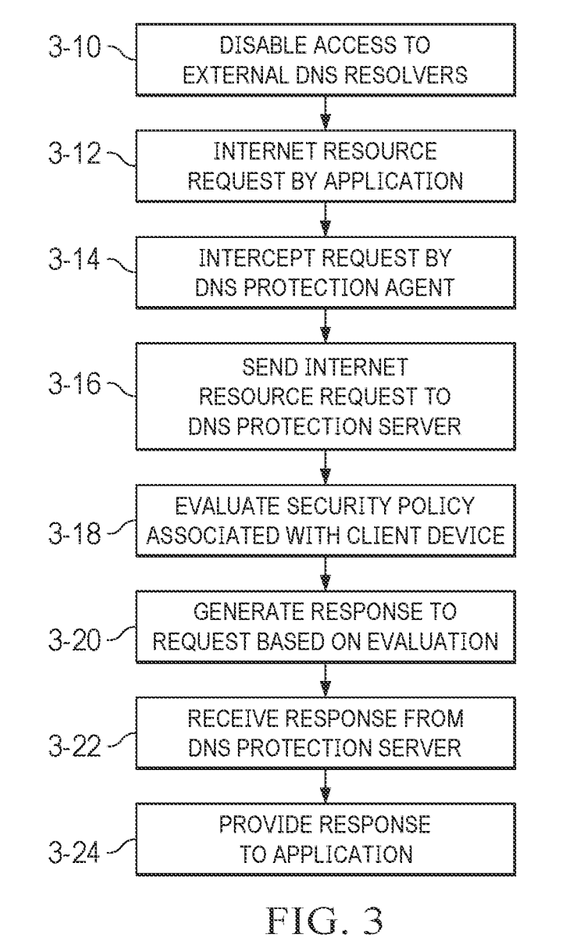
FIG. 3 depicts a flowchart illustrating an example of a process for DNS resolution.

FIG. 3 is a flowchart illustrating an example of a process for DNS resolution, using the techniques described above. This example will be described in the context of an application running on a client device requesting an internet resource. As mentioned above, in a conventional system, the operating system, process, or the application itself may contact an external DNS resolver. To prevent DNS leaks and increase security, access to external DNS resolvers is disabled for the application and the operating system (step 3-10). This may be done by inspecting traffic for DNS requests or blocking communication on port 53 TCP and UDP, and traffic on port 853 TCP.

When the application makes a request for an internet resource (step 3-12), the request is intercepted by a DNS protection agent (step 3-14). The DNS protection agent will handle DNS resolution for the client device using a trusted DNS protection server. The DNS protection agent sends the Internet resource request to the DNS protection server (step 3-16) to resolve the Internet address of the requested resource.

The DNS protection server will receive the DNS request from the DNS protection agent and make a determination as to how to handle the DNS request. In some embodiments, the DNS protection server has access to a database(s) of domain data and system policy data. The DNS protection server evaluates the request with respect to domain data and/or security policy data to make the determination (step 3-18). For example, if the domain associated with the received DNS request is not a blocked domain, the DNS protection server can return the DNS record for the DNS request, which could involve contacting one or more other DNS servers or a cache, for example. However, if the domain associated with the DNS request is blocked, the DNS protection server may return the address of a blocked page notification or another block or error indication. The determination whether a domain is blocked may be made with reference to domain data and system policy data associated with the requesting client device, as described above. The determination may be made in other manners as well, as one skilled in the art would understand.

At step 3-20 a response is generated by the DNS protection server, based on the determination described above. At step 3-22, the DNS protection agent receives the response from the DNS protection server, and provides the response to the application (step 3-24). As a result, DNS resolution is accomplished, while maintaining visibility (by the system) of DNS activity and preventing DNS leaks (described above).

Figure 4:
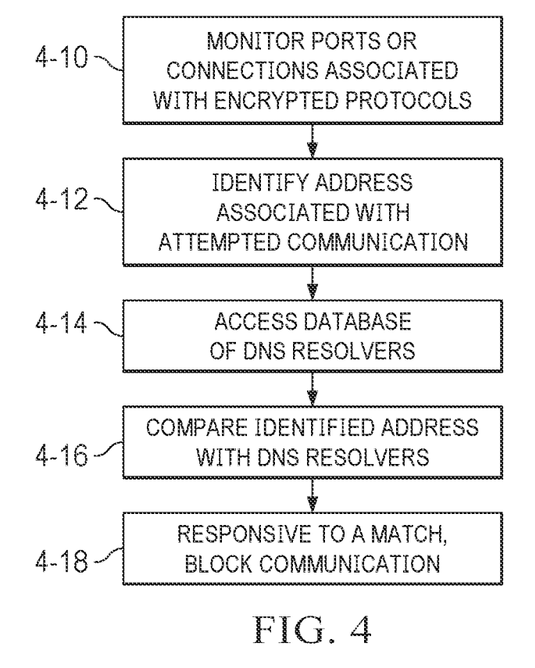
FIG. 4 depicts a flowchart illustrating an example of a process for DNS resolution where DNS security protocols are utilized for DNS resolution.

As described above, in some situations, encrypted security protocols are utilized for such DNS requests, including DoH and DoT. In order to implement DNS leak protection and ensure that DNS resolution is accomplished only through the DNS protection server, the DNS protection agent can monitor and block connections to known DNS resolvers. FIG. 4 is a flowchart illustrating an example of a process for DNS resolution where DoH or DoT are utilized for DNS resolution, using the techniques described above.

In the example of DoH and DoT, ports 443 and 853, respectively, are typically used. At step 4-10, the DNS protection agent monitors ports 443 and 853 to detect when the application or local DNS server are attempting to make DNS requests using DoH or DoT to external DNS resolvers. If the DNS protection agent detects attempted communications over one of the monitored ports, at step 4-12, it identifies the associated address (presumably the address of an external DNS resolver).

As described above, the DNS protection agent maintains a DNS resolver database of known DNS resolvers for these secure DNS protocols (e.g., the IP addresses of such DNS resolver). The DNS protection agent accesses the DNS resolver database (step 4-14) and compares (step 4-16) the identified address associated with the attempted communication with the address of the known DNS resolvers in the DNS resolver database. If the identified address in the DNS resolver database, this attempted communication can be blocked (e.g., using a system firewall) at step 4-18. In this manner, DNS leaks, including DNS leaks resulting from an application's use of a secure DNS protocol, or the DNS service's use of these secure DNS protocols is prevented. This forces the client device to use the DNS protection agent for successful DNS resolution, thus maintaining visibility of DNS activity and preventing DNS leaks.

Figure 5:
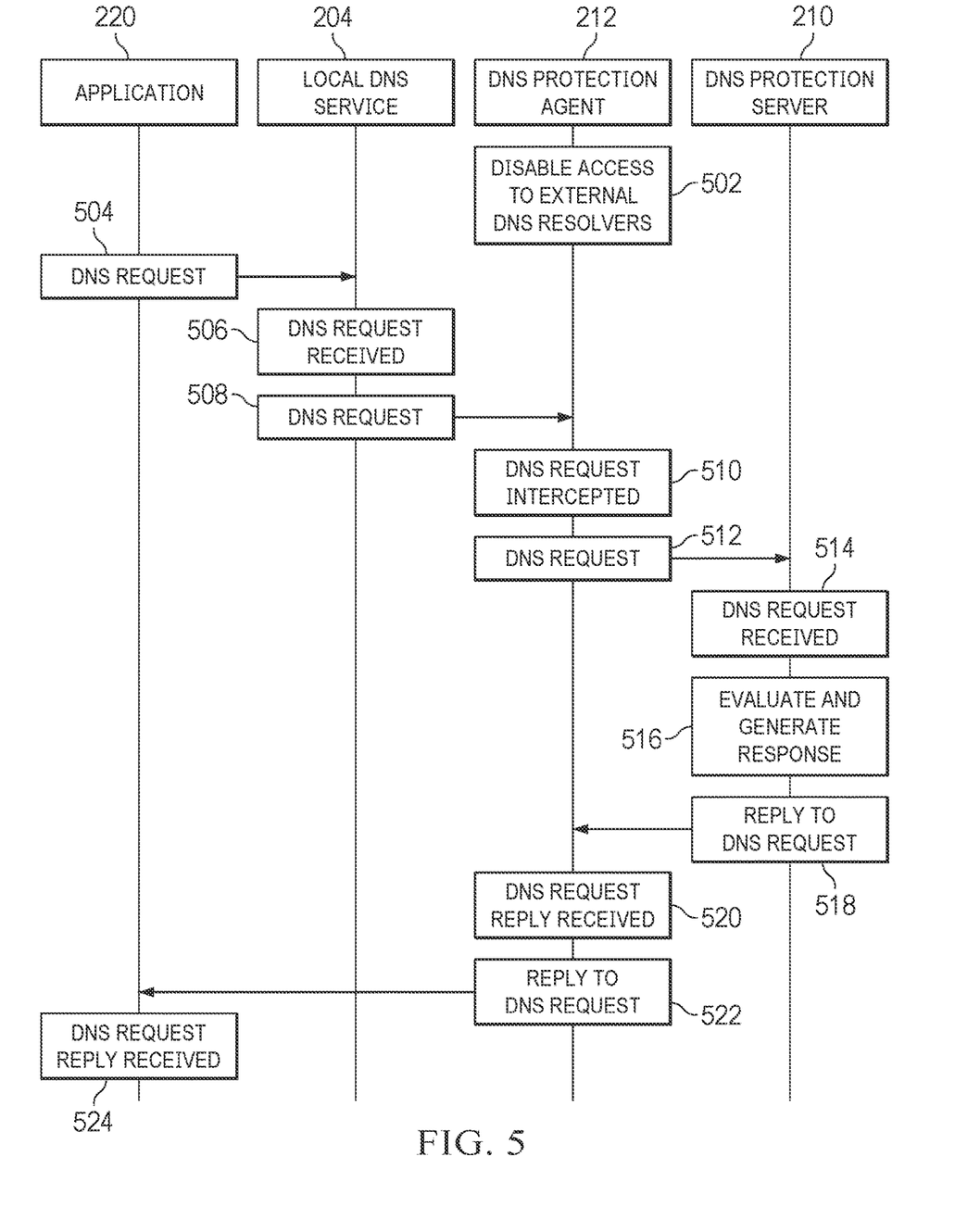
FIGS. 5 and 6 depict embodiments of processes for DNS resolution.
Figure 6:
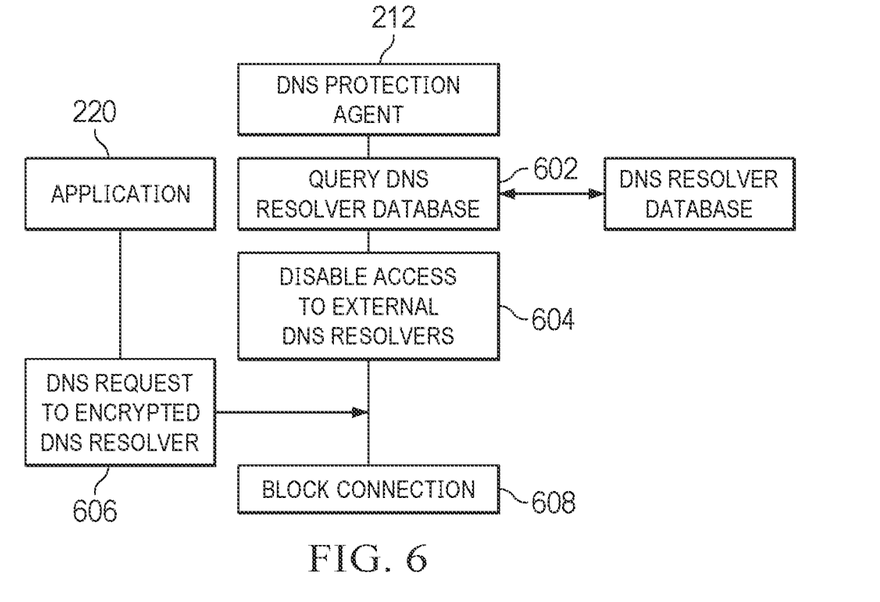

Embodiments of the processes described above may be illustrated in more detail with reference to FIGS. 5 and 6 that illustrate examples of communications and actions of the various components of a system. Referring first to FIG. 5, one embodiment of a method for DNS resolution is illustrated that maintains DNS visibility, while preventing DNS leaks. As before, this example will be described in the context of an application running on a client device requesting an internet resource. Initially, at step 502, the DNS protection agent disables access to external DNS resolvers for the application and operating system to prevent DNS leaks and increase security. This can be accomplished via a firewall, for example.

At step 504, the application makes a DNS request for an internet resource. The DNS request is received by the operating system at step 506. The operating system forwards the DNS request at step 508. At step 510, the DNS protection agent intercepts the DNS request (rather than allowing the DNS request to be sent to an external DNS resolver, as happens in traditional DNS resolution). As described above, the DNS protection agent will handle DNS resolution for the client device using a trusted DNS protection server, which may be either under the control of, or trusted by an enterprise. At step 512, the DNS protection agent sends the DNS request to the DNS protection server to resolve the Internet address of the requested resource.

At step 514, the DNS protection server receives the DNS request from the DNS protection agent and make a determination as to how to handle the DNS request. In some embodiments, the DNS protection server has access to a database(s) of domain data and system policy data. At step 516, the DNS protection server evaluates the request with respect to domain data and/or security policy data and generates an appropriate response, based on the evaluation. For example, if the domain associated with the received DNS request is not a blocked domain, the DNS protection server can return the DNS record for the DNS request. However, if the domain associated with the DNS request is blocked, the DNS protection server may return the address of a blocked page notification or another block or error indication. The determination whether a domain is blocked may be made with reference to domain data and system policy associated with the requesting client device, as described above. The determination may be made in other manners as well, as one skilled in the art would understand. At step 518, the DNS protection server sends the response to the DNS request to the DNS protection agent.

At step 520, the DNS protection agent receives the DNS request reply from the DNS protection server. At step 522, the DNS protection agent provides the response (whether it be the resource address or a denial notification) to the application (directly, or via the operating system). At step 524, the application receives the DNS request reply. If the reply contains the requested DNS record, the application can retrieve the requested Internet resource. If the reply contains a denial notification, the application may provide a blocked page notification (or other block or error indication) to a user via a user interface device. As a result, DNS resolution is accomplished, while maintaining visibility (by the system) of DNS activity and preventing DNS leaks.

As mentioned above, in some situations, encrypted security protocols may be utilized for DNS requests, for example, via DoH and DoT. As described in detail above, to implement DNS leak protection and ensure that DNS resolution is accomplished only through the DNS protection server, the DNS protection agent can monitor ports used by the respective DNS protocols (e.g., port 443 for DoH, port 853 for DoT, etc.). Referring now to FIG. 6, one embodiment of a method for DNS resolution with respect to encrypted DNS protocols is illustrated that maintains DNS visibility, while preventing DNS leaks. This example will be described in the context of an application running on a client device requesting an internet resource via DoH or Dot, although the methodology applies to other protocols as well, as one skilled in the art would understand.

Initially, at step 602, the DNS protection agent gets a list of known external DNS resolvers. At step 604, the DNS Protection agent disables access to known external DNS resolvers by blocking connections to the addresses. As before, this can be accomplished via a firewall.

At step 606, the application 220 makes a DNS request using DoH or DoT protocol (for example). Since the DNS protection agent has blocked connections to known external DNS resolvers, the connection is blocked (step 608).

As a result, DNS leaks, including DNS leaks resulting from an application's or process's use of a secure DNS protocol, or the operating system's use of these secure DNS protocols, is prevented. In the case where the database query did not identify the DNS resolver, the DNS protection agent may allow communication for example, to allow HTTPS or TLS communications.

As discussed above, one problem relating to DNS security is that they have found ways to target and exploit DNS servers, including DNS tunneling attacks. DNS tunneling is an attack that uses other protocols to tunnel through DNS queries and responses. Attackers can use SSH, TCP, or HTTP to pass malware or stolen information into DNS queries, undetected by most firewalls. The disclosed DNS protection server, discussed above, provides mechanisms for detecting and addressing potential DNS tunneling attacks.

Figure 7:
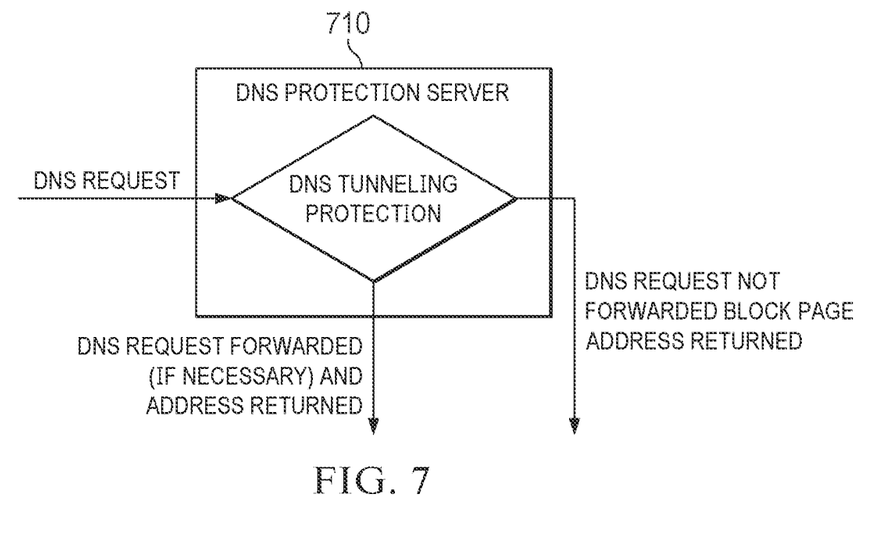
FIG. 7 depicts a block diagram of a DNS protection server.

FIG. 7 is a block diagram of a DNS protection server 710. Details of DNS protection servers are discussed in detail above. FIG. 7 illustrates the functionality of a DSN protection server in the context of addressing possible DNS tunneling attacks. Generally, as shown, a DNS protection agent intercepts DNS requests and sends the DNS request to the DNS protection server 710 to resolve the Internet address of the requested resource (e.g., see FIG. 5, discussed above). The DSN protection server 710 is capable of detecting the presence of DNS tunneling (discussed below). Generally, if DNS tunneling is detected, the DNS request is not forwarded, and a block page address is returned to the requesting application. If DNS tunneling is not detected, the DNS request is forwarded (if necessary), and an address is returned (as discussed above, with respect to FIGS. 4-6). In some embodiments, this functionality could also be (at least partially) implemented elsewhere, such as in the DNS protection agent.

Figure 8:
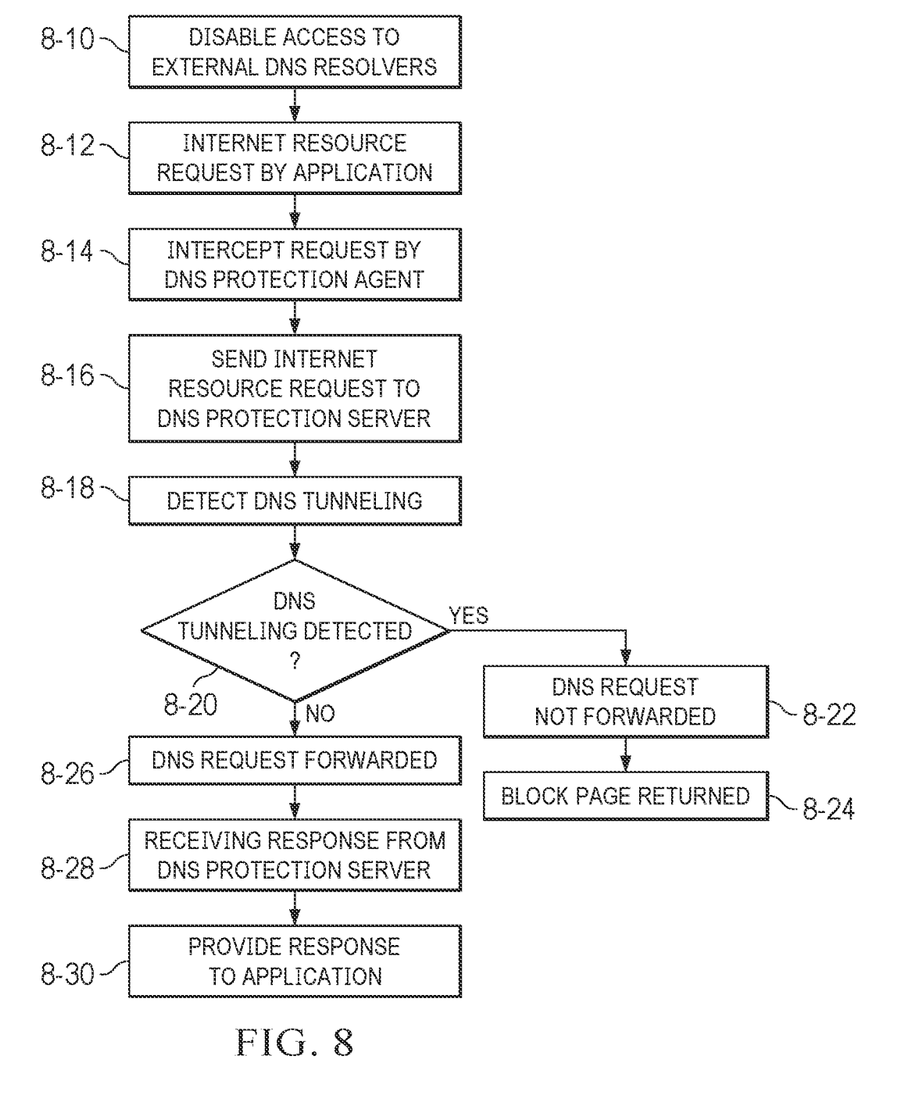
FIG. 8 depicts a flowchart illustrating an example of a process for addressing possible DNS tunneling attacks.

FIG. 8 is a flowchart illustrating an example of a process for DNS tunneling protection, in the context of DNS resolution, as described above. As before, this example will be described in the context of an application running on a client device requesting an internet resource. DNS tunneling protection may also be provided in other contexts, as one skilled in the art would understand. As mentioned above, in a conventional system, the operating system, process, or the application itself may contact an external DNS resolver. To prevent DNS attacks, including DNS leaks (described above) and DNS tunneling, access to external DNS resolvers is disabled for the application and the operating system (step 8-10). This may be done, for example, by inspecting traffic for DNS requests or blocking communication on port 53 TCP and UDP, and traffic on port 853 TCP.

When the application makes a request for an internet resource (step 8-12), the request is intercepted by a DNS protection agent (step 8-14), which is discussed in detail above. The DNS protection agent will handle DNS resolution for the client device using a trusted DNS protection server. The DNS protection agent sends the Internet resource request to the DNS protection server (step 8-16) to resolve the Internet address of the requested resource.

As discussed above with respect to FIG. 3, various steps are performed for the prevention of DNS leaks. In addition, steps may also be taken to prevent malicious DNS tunneling. In this example, at step 8-18 the presence of DNS tunneling is detected. Detecting the presence of detecting DNS tunneling can be accomplished using conventional techniques, as one skilled in the art would understand. In some embodiments, an entropy score can be calculated that relates to the confidence that malicious DNS tunneling has been detected, and if the core reaches a threshold, the system will consider that malicious DNS tunneling has being detected. In some embodiments, one or more web reputation services can be queried to assist in making a determination. Also note that different thresholds may be used in different contexts, depending on the risks and consequences (e.g., a banking context may have a lower threshold than other contexts, etc.).

Non-exclusive examples of techniques for detecting DNS tunneling include payload analysis (e.g., abnormal domains, etc.), request/response size, hostname entropy (e.g., encoded names), statistical analysis (e.g., analysis of host names for items such as numbers, etc.), uncommon record types, policy violations, checking for specific signatures, traffic analysis, etc. Numerous other examples are also possible. For example, conventional examples of DSN detection are described in the paper entitled "Global Information Assurance Certification Paper," ("giac.org/paper/gcia/1116/detecting-dns-tunneling/108367") which is incorporated by reference herein in its entirety.

If, at step 8-20, DNS tunneling is detected, the process proceeds to step 8-22, where the DNS request is not forwarded, thus stopping a possible DNS tunneling attack. At step 8-24, a block page address is returned to the requesting application. If DNS tunneling is not detected, the DNS request is forwarded (if necessary), and an address is returned, as discussed above, with respect to FIGS. 4-6.

If, at step 8-20, DNS tunneling is not detected, the process proceeds to step 8-26, where the DNS request is forwarded (if necessary), and handled in the manner described above, such as by returning an address. As described in detail above, the DNS protection server will make a determination as to how to handle the DNS request, once it has determined that a possible DNS tunneling attack is not detected. In some embodiments, the DNS protection server has access to a database(s) of domain data and system policy data. The DNS protection server evaluates the request with respect to domain data and/or security policy data to make the determination. For example, if the domain associated with the received DNS request is not a blocked domain, the DNS protection server can return the DNS record for the DNS request, which could involve contacting one or more other DNS servers or a cache, for example. However, if the domain associated with the DNS request is blocked, the DNS protection server may return the address of a blocked page notification or another block or error indication. The determination whether a domain is blocked may be made with reference to domain data and system policy data associated with the requesting client device, as described above. The determination may be made in other manners as well, as one skilled in the art would understand. A response is generated by the DNS protection server, based on the determination described above. At step 8-28, the DNS protection agent receives the response from the DNS protection server, and provides the response to the application (step 8-30). As a result, DNS resolution is accomplished, while maintaining visibility (by the system) of DNS activity and preventing DNS leaks and DNS tunneling.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. For example, it will be understood that while embodiments as discussed herein are presented in the context of a browser based application other embodiments may be applied with equal efficacy to other types of components on computing device (e.g., other native components, etc.).

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the otherwise (i.e., that the reference "a" or "an" clearly indicates only the singular or only the plural).

What is claimed is:

1. A method for detecting and addressing DNS tunneling, the method comprising:
    on a client device, disabling access at a client operating system on the client device to a DNS resolver external to the client device;
    enabling access at the client operating system to a DNS protection agent for resolving DNS server addresses using a trusted DNS protection server, wherein the DNS protection agent is locally installed at the client device and in secure communication with the DNS protection server;
    generating an outbound DNS request, by an application executing on the client device, the outbound DNS request designating an Internet address for an Internet resource and specifying a DNS resolver;
detecting, by the DNS protection agent at a port of the client device associated with a DNS protocol, the outbound DNS request from the application;
blocking the outbound DNS request to the DNS resolver from the application;
detecting whether the outbound DNS request includes a presence of DNS tunneling;
when the presence of DNS tunneling is detected, generating a response, including a block page address without forwarding the outbound DNS request to the specified DNS resolver;
when the presence of DNS tunneling is not detected generating a response to the outbound DNS request; and
receiving the response from the DNS protection server and forwarding the response to the client device.

2. The method of claim 1, wherein the response from the DNS protection server comprises either the Internet address for the Internet resource or a denial message.

3. The method of claim 2, wherein the response from the DNS protection server is determined based on an evaluation of a security policy associated with the client device.

4. The method of claim 3, wherein the security policy specifies reputation scores or categories associated with domains.

5. The method of claim 1, wherein the detecting further comprises calculating a confidence score related to the presence of DNS tunneling and comparing the score to a threshold level.

6. The method of claim 5, wherein the DNS protection agent is coupled to a DNS resolver database, the DNS resolver database storing addresses of known DNS resolvers associated with the DNS security protocols.

7. The method of claim 6, further comprising comparing, by the DNS protection agent, an address associated with an attempted communication with addresses stored in the DNS resolver database.

8. The method of claim 7, further comprising blocking communications with the address associated with the attempted communication if the address is associated with a known DNS resolver.

9. The computer program product of claim 1, wherein the response from the DNS protection server comprises either the Internet address for the Internet resource or a denial message.

10. The computer program product of claim 9, wherein the response from the DNS protection server is determined based on an evaluation of a security policy associated with the client device.

11. The computer program product of claim 10, wherein the detecting further comprises calculating a confidence score related to the presence of DNS tunneling and comparing the score to a threshold level.

12. A system for DNS resolution, comprising:
a processor;
a computer storage device in electronic communication with the processor, the computer storage device storing instructions that, when executed by the processor, perform a method of:
on a client device, disabling access at an operating system on the client device to a DNS resolver external to the client device;
enabling access at the operating system to a DNS protection agent for resolving DNS server addresses using a trusted DNS protection server, wherein the DNS protection agent is locally installed at the client device and in secure communication with the DNS protection server;
generating an outbound DNS request by an application executing on the client device, the outbound DNS request designating an Internet address for an Internet resource and specifying a DNS resolver;
detecting, by the DNS protection agent at a port of the client device associated with a DNS protocol, the outbound DNS request from the application;
blocking the outbound DNS request to the DNS resolver from the application;
detecting whether the outbound DNS request includes a presence of DNS tunneling;
when the presence of DNS tunneling is detected, generating a response, including a block page address without forwarding the outbound DNS request to the specified DNS resolver;
when the presence of DNS tunneling is not detected generating a response to the outbound DNS request; and
receiving the response from the DNS protection server and forwarding the response to the client device.

13. The system of claim 12, wherein the response from the DNS protection server comprises either the Internet address for the Internet resource or a denial message.

14. The system of claim 13, wherein the response from the DNS protection server is determined based on an evaluation of a security policy associated with the client device.

15. The system of claim 14, wherein the security policy specifies reputation scores or categories associated with domains.

16. The system of claim 12, wherein the detecting further comprises calculating a confidence score related to the presence of DNS tunneling and comparing the score to a threshold level.

17. The system of claim 16, wherein the DNS protection agent is coupled to a DNS resolver database, the DNS resolver database storing addresses of known DNS resolvers associated with the DNS security protocols.

18. The system of claim 17, further comprising comparing, by the DNS protection agent, an address associated with an attempted connection with addresses stored in the DNS resolver database.

19. The system of claim 18, further comprising blocking connections with the address associated with a known DNS resolver.

20. A computer program product comprising a non-transitory computer readable medium storing a set of computer instructions executable by a processor, the set of computer instructions comprising instructions for:
on a client device, disabling access at an operating system on the client device to a DNS resolver external to the client device;
enabling access at the operating system to a DNS protection agent for resolving DNS server addresses using a trusted DNS protection server, wherein the DNS protection agent is locally installed at the client device and in secure communication with the DNS protection server;
generating an outbound DNS request by an application executing on the client device, the outbound DNS request designating an Internet address for an Internet resource and specifying a DNS resolver;
detecting, by the DNS protection agent at a port of the client device associated with a DNS protocol, the outbound DNS request from the application;

blocking the outbound DNS request to the DNS resolver from the application;
detecting whether the outbound DNS request includes a presence of DNS tunneling;
when the presence of DNS tunneling is detected, generating a response, including a block page address without forwarding the outbound DNS request to the specified DNS resolver;
when the presence of DNS tunneling is not detected generating a response to the outbound DNS request; and
receiving the response from the DNS protection server and forwarding the response to the client device.

* * * * *